United States Patent [19]

Panth

[11] Patent Number: 4,776,504

[45] Date of Patent: Oct. 11, 1988

[54] ARRANGEMENT IN HARNESSES USED WITH MOTORDRIVEN CLEARING SAWS

[76] Inventor: Erik Panth, Ed 4093, S-742 00 Östhammar, Sweden

[21] Appl. No.: 43,743

[22] Filed: Apr. 29, 1987

[30] Foreign Application Priority Data

May 12, 1986 [SE] Sweden ................................ 8602140

[51] Int. Cl.[4] .......................... B26B 27/00; A45F 5/14
[52] U.S. Cl. .................... 224/209; 30/296 R; 30/381; 224/197; 224/258
[58] Field of Search ............. 30/296 R, 381; 224/191, 224/197, 202, 204, 205, 206, 208, 209, 210, 211, 212, 216, 257, 258, 259, 265, 266

[56] References Cited

U.S. PATENT DOCUMENTS

| 332,123 | 12/1885 | Walton | 224/258 |
|---|---|---|---|
| 860,794 | 7/1907 | Felts | 224/259 |
| 1,198,602 | 9/1916 | Sweeney | 224/216 |
| 1,494,183 | 5/1924 | Ohman | 224/257 X |
| 1,589,077 | 6/1926 | Hooper | 224/211 |
| 2,441,115 | 5/1948 | Lambert | 224/204 |
| 2,986,314 | 5/1961 | Miller | 224/266 |
| 3,453,732 | 7/1969 | Wilkin | 30/296 R |
| 4,254,901 | 3/1981 | McIntosh | 224/258 |
| 4,271,999 | 6/1981 | Stravitz | 224/257 |
| 4,327,852 | 5/1982 | Gibson | 224/209 X |
| 4,483,070 | 11/1984 | Junkermann | 30/296 R |
| 4,660,751 | 4/1987 | von Dewitz | 224/210 |

FOREIGN PATENT DOCUMENTS

| 2527295 | 11/1976 | Fed. Rep. of Germany | 224/265 |
|---|---|---|---|
| 318072 | 12/1969 | Sweden . | |
| 366469 | 4/1974 | Sweden . | |
| 16228 | 4/1975 | Sweden . | |

Primary Examiner—Henry J. Recla
Assistant Examiner—Ernest G. Cusick

[57] ABSTRACT

Clearing saw harness to which a clearing saw is to be removably attached with the weight thereof transferred to the shoulder of the wearer via elongated parts (3, 4), extending from a backpiece (2) over the shoulders and releasably couplable to each other at the front by a coupling (5, 6) mounted on each part and releasably interconnected, each coupling being adjustable longitudinally of the part to one of a plurality of possible positions. A saw support is connected by strap means (8) to one of the coupling and to the back piece.

7 Claims, 2 Drawing Sheets

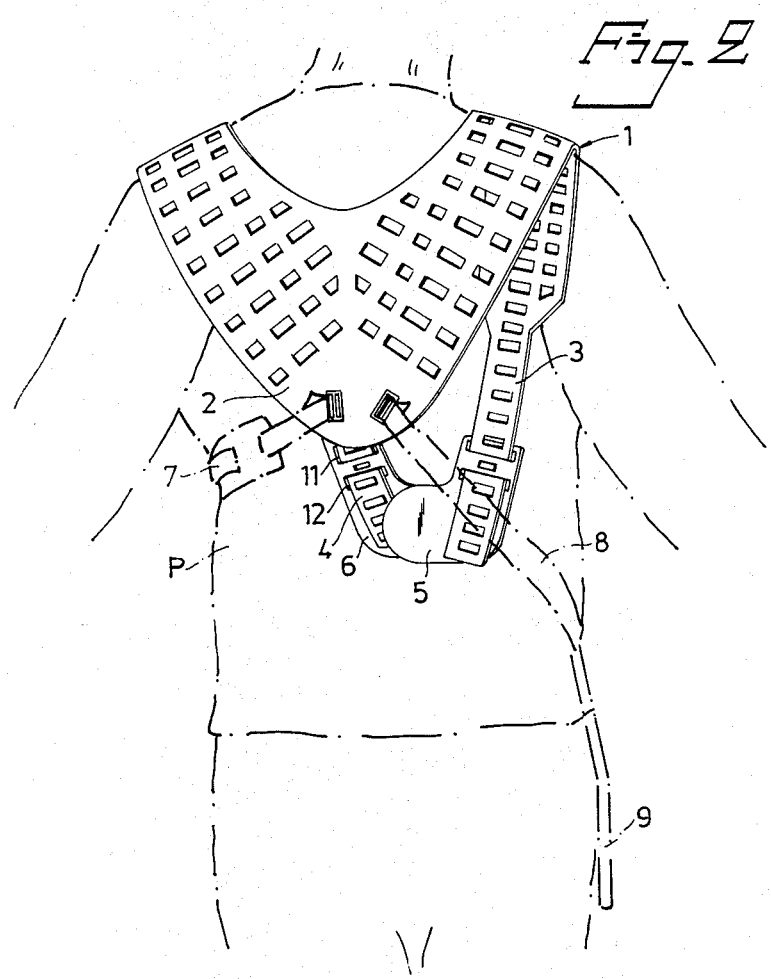
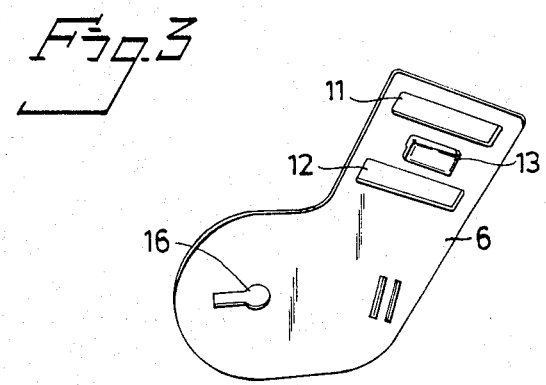

ARRANGEMENT IN HARNESSES USED WITH MOTORDRIVEN CLEARING SAWS

BACKGROUND OF THE INVENTION

1. Technical Field

The present invention relates to an arrangement in harnesses used in connection with motordriven clearing saws, the harness being worn by a person so that the weight of a clearing saw removably attached to the harness and operated by the wearer is transferred to the shoulder portions of the wearer via elongate parts laid over them, these parts being mutually fastenable at the front of the body with the aid of fastening means on each part.

2. Background Art

Clearing saw harnesses of the kind mentioned above are already known. An example of such a harness is shown in the Swedish design registration 16 228. A disadvantage burdening the known harnesses is that they cannot be satisfactorily adjusted to the size of the person wearing the harness, and neither such that the weight of the saw is distributed to the wearer's body in an ergonomic way which the wearer also finds comfortable. Other disadvantages are that the fastening means between both parts are not reliable and must be manufactured and fitted in individual operations.

DISCLOSURE OF THE INVENTION

One object of the present invention is to at least partially remove the disadvantages with previously known arrangements in clearing saw harnesses and to achieve an arrangement which is adjustable to the wearer, the weight of the saw and its suspension point, and in which the fastening means are reliable as well as being simple to manufacture and handle.

This object is achieved by the arrangement in accordance with the invention having been given the distinguishing features disclosed in the characterizing parts of the claims.

BRIEF DESCRIPTION OF THE DRAWINGS

FIGS. 1 and 2 are perspective views seen from the front and from the back, respectively, of a clearing saw harness worn by a person, and including the arrangement in accordance with the present invention, and FIG. 3 is a perspective view of a part of the arrangement according to FIGS. 1 and 2.

DETAILED DESCRIPTION OF THE PREFERRED EMBODIMENT

Figure 1:
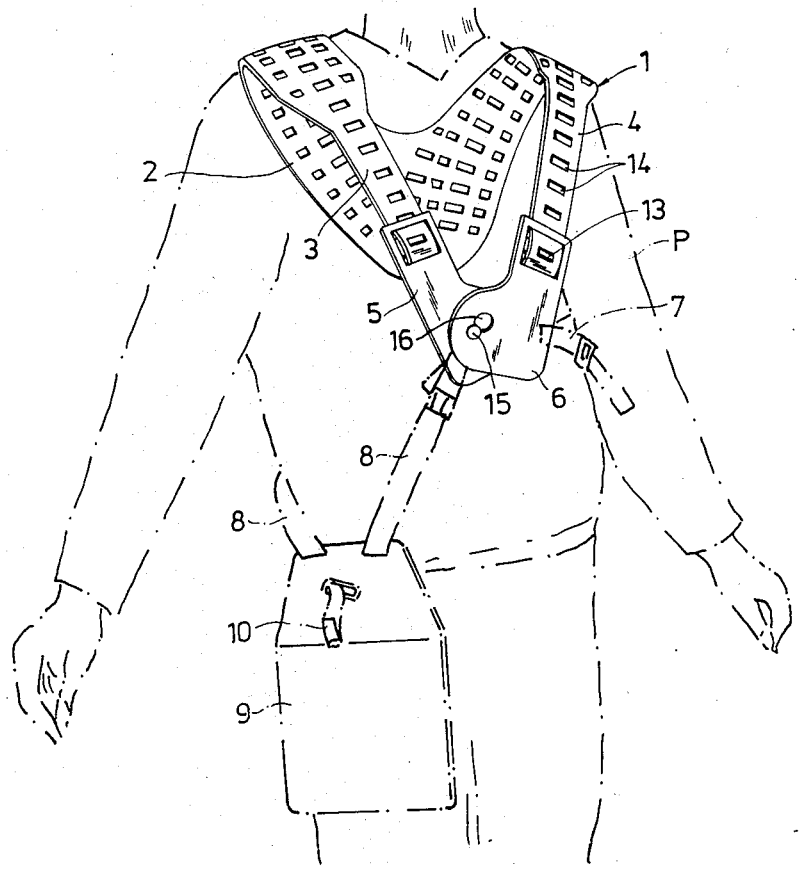

A clearing saw harnes, generally denoted by the numeral 1, is worn by a person P. The harness 1, manufactured from flexible, unstretchable plastics material, includes a substantially V-shaped part 2, lying against the back of the person P, and integral with it two elongate parts 3 and 4 lying against the person's shoulders and chest. Substantially L-shaped plates 5 and 6 are removably and adjustably fastened at the free ends of the parts 3 and 4.

The plates 5 and 6 form coupling means, which are removably coupled to each other. How the plates 5 and 6 are fastened and coupled to each other will be described in detail below.

A first strap 7 with adjustable length connects the removable plate 6 with the part 2 via holes made in these parts, and a second strap 8 with adjustable length connects the removable plate 5 with the part 2 via holes made in them. The strap 8 also runs through holes in a cushion in the from of a plate 9 and is connected to a hook 10 engaging against the outside of the plate 9. The plate 9 rests against the hip or thigh of the person P, and an unillustrated clearing saw suspended from the hook 10 is intended to engage against the outside of the plate for taking up compression and turning forces transferred to the person P.

In order to adjust the harness to the size of the person P, so that the weight of the saw is distributed ergonomically over the back and shoulder portions of the person, and so that the saw can be handled with the least possible exertion for the person, the plates 5 and 6, which are removably coupled to each other, are adjustably connected to the parts 3 and 4 in the following manner. Since plates 5 and 6 are identical for this purpose, only the connection of the plate 6 to the part 4 will be described. The plate 6, illustrated in more detail in FIG. 3, is provided with two holes 11 and 12 and an intermediate L-shaped locking member 13. The part 4, which has a width somewhat falling below the length of the holes 11 and 12, and which is provided with a plurality of equally large holes 14 along its length, is inserted through the holes 11 and 12 in the manner illustrated in FIGS. 1 and 2, the locking means 13, with its free leg directed downwards in the FIGURES then projecting into one of the holes 14. By displacing the plate 6 upwards in FIGS. 1 or 2, in relation to the part 4, and simultaneously bending out the part from the plate in the area of the locking means 13, the latter is released from the part and it is subsequently possible to displace the plate on the part to a desired position for engagement between the locking means and any hole 14 on the part.

The plates 5 and 6 are provided with one of the locking means 15 and 16, each integral with the respective plate, for being removably coupled to each other. The locking means 15 is the plate 6 a dowel or pin projecting out from the plate 5 and having a portion (unillustrated) with decreased cross section. The locking means 16 comprises an irregular hole with a first, substantially circular part somewhat greater that the dowel, and a second substantially rectangular part, the width of which is less than the dowel diameter and slightly greater than the portion of the dowel in the region of its decreased cross section. The dowel 15 is insertable in the circular part of the hole 16 and subsequently displaceable in the rectangular part of the hole when its decreased cross section is in line with the plane of the plate 6. In the latter position the plates 5 and 6 cannot be removed from each other by displacement at right angles to the plane of the plates.

Even if only one embodiment of the invention has been described above and illustrated on the drawings, it will be understood that the invention is not limited to this embodiment but only by what is disclosed in the claims.

What is claimed as new and desired to be secured by Letters Patent of the United States:

1. A harness for use in carrying a clearing saw comprising a back piece and a pair of elongated parts extending form said back piece and adapted to extend over and to transfer the weight of the saw onto the shoulders of a wearer, a coupling plate for each of said elongated parts and means for securing said coupling plates to respective ones of said elongated parts for adjustment of said coupling plates lengthwise of said elongated parts, said coupling plates including cooperating fastening means on said coupling plates for separably securing said coupling plates together, wherein said coupling plates overlap when secured together, a saw support, and strap means for securing said saw support to one of said coupling plates and to said back piece.

2. A harness in accordance with claim 1, wherein the elements which comprise said harness are formed of plastic.

3. A harness in accordance with claim 1 having further strap means for securing the coupling plate other than the one secured to said saw support to said back piece.

4. A harness in accordance with claim 1 in which said saw support includes means for releasably securing the saw thereto.

5. A harness for use in carry a clearing saw comprising a back piece and a pair elongated parts extending from said back piece and adapted to extend over and to transfer the weight of the saw onto the shoulders of a wearer, a coupling plate for each of said elongated parts and means for securing said coupling plates to respective ones of said elongated parts for adjustment of said coupling plates lengthwise of said elongated parts, said coupling plates including cooperating fastening means on said coupling plates for separably securing said coupling plates together, a saw support, and strap means for securing said saw support to one of said coupling plates and to said back piece, wherein said strap means is adjustable to vary the length thereof.

6. A harness in accordance with claim 5 in which said coupling plates are adjustable lengthwise of said elongated parts to one of a plurality of positions.

7. A harness in accordance with claim 6 in which said means for securing said elongated parts to said coupling plates comprise a plurality of holes in said elongated parts, a pair of slots in each of said coupling plates through which the respective elongated parts are extended lengthwise, and a locking member on each of said coupling plates between said slots for cooperating with one of said holes in the respective elongated part to lock said elongated parts against movement lengthwise relative to said coupling plates.

* * * * *